Patented Feb. 8, 1944

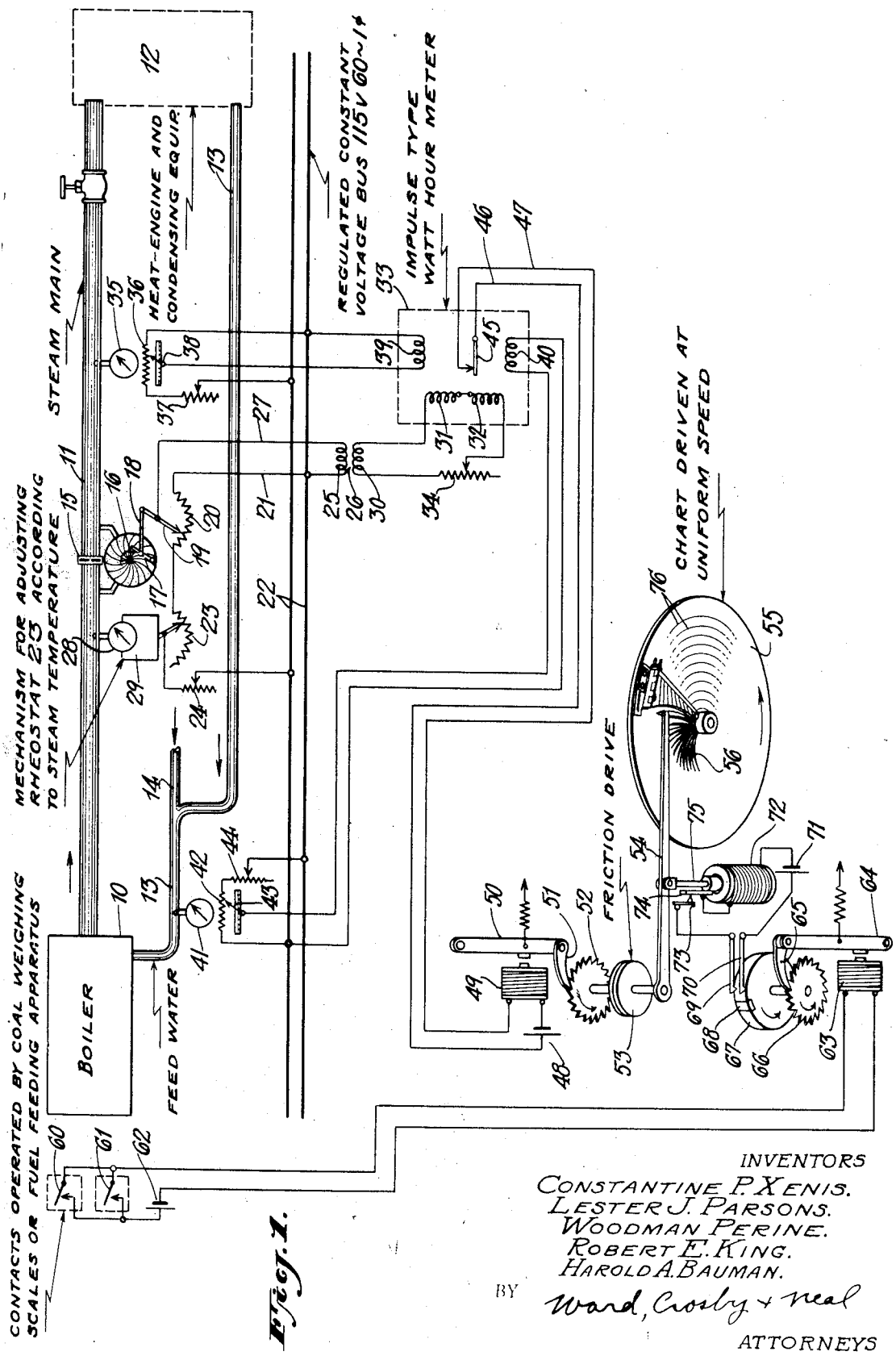

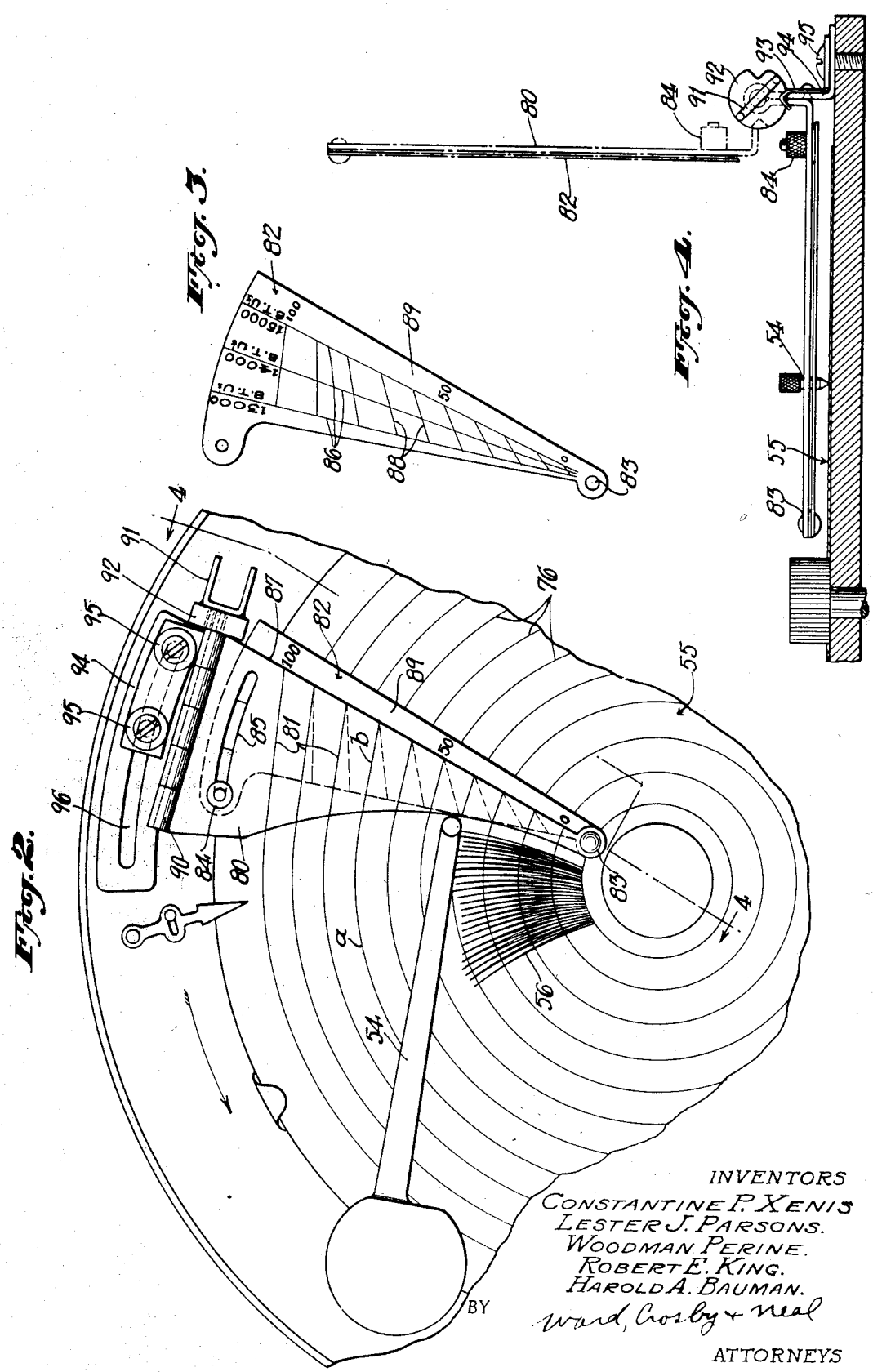

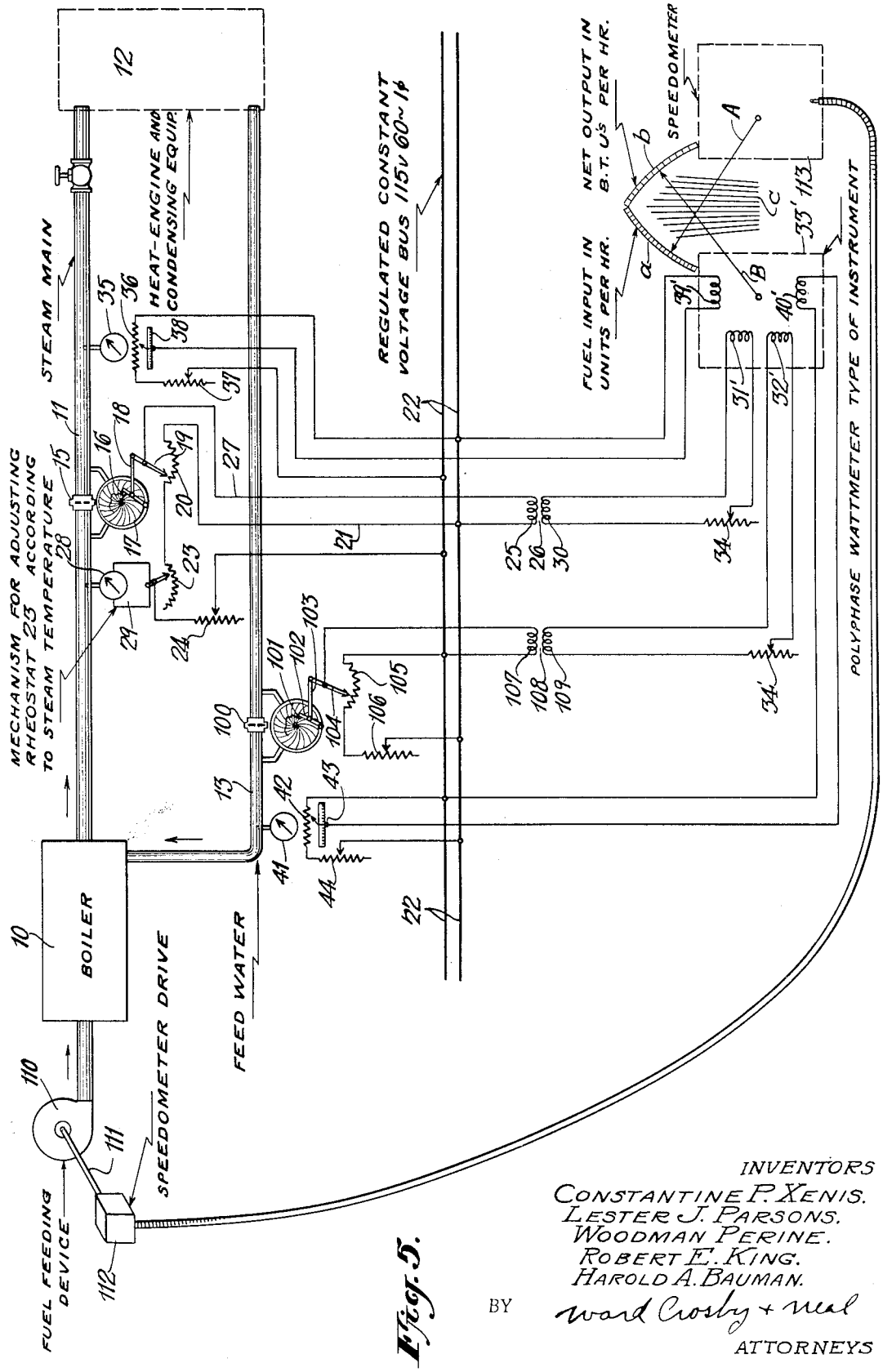

2,341,407

UNITED STATES PATENT OFFICE 2,341,407

METHOD AND APPARATUS FOR INDICATING EFFICIENCY OF BOILERS OR THE LIKE

Constantine P. Xenis, Little Neck, Lester J. Parsons, Queens Village, Woodman Perine, Halesite, Robert E. King, Brooklyn, and Harold A. Bauman, Forest Hills, N. Y., assignors to Consolidated Edison Company of New York, Inc., New York, N. Y., a corporation of New York Application May 10, 1941, Serial No. 392,909

5 Claims. (Cl. 234—5.8)

This invention relates to methods and apparatus for indicating efficiency of energy transforming equipment such for example as boilers or other evaporating devices in power plants and the like. The invention will be particularly described as for indicating the efficiency of steam boilers for power plants, but it will be understood that the invention and certain of its features is also adaptable for use in connection with other power plant equipment.

In our application Serial No. 392,908, filed concurrently herewith and entitled "Methods and apparatus for indicating efficiency of turbo-generators and other power plant equipment," methods and apparatus are disclosed for applying certain features and principles of this invention to problems such as automatically indicating the efficiency of power generating units, including turbo-generators and their auxiliary equipment.

Heretofore, in order to measure the efficiency of boilers or the like, it has been necessary to resort to the method of simultaneously and manually measuring and recording the pressure, temperature and flow of the steam from the boiler, while also weighing the fuel input. Then upon resorting to steam tables and computations, the efficiency of the boiler for the particular period of the test may be approximately calculated. This method is not only expensive and time-consuming, but requires the services of experts and yet does not provide indications for promptly showing the effect on the efficiency of numerous changes and adjustments which may be made in the operating conditions. On the other hand, according to the present invention, measurement of factors affecting the efficiency may constantly be made and correlated automatically so as to substantially immediately indicate the efficiency, and the extent to which the efficiency varies because of any changes being made in the operating conditions for the boiler, or other device being tested.

It is believed that the invention provides for the first time, complete and practical means by which accurate efficiency indications may be substantially immediately given and recorded as desired, to permit a power plant operator to adjust and control for highest efficiency the various operating conditions, and to try different combinations of conditions, and immediately note the effect of the changes on the efficiency. For example, prompt efficiency indications may be given for various rates of steam generation at various temperatures and pressures, and with different kinds and quantities of fuel when fed or supplied to the boiler, either intermittently in various ways, or continuously. Such data may be used for determining how the load may most economically be distributed as between various boilers of a plant. The heat rate indications as given from time to time may indicate any trend toward decreased efficiency, and thus serve as a basis for maintenance and repair schedules. The invention is also well adapted for making a permanent record of the efficiency of each boiler or of several boilers collectively. The invention thus affords means to enable operation of the plant at highest efficiency with consequent large savings in fuel while eliminating the great expense of efficiency tests of the type heretofore necessary. The use of the invention will focus the attention of operating personnel on practices conducive to maximum operating efficiency and enable detailed comparison of the operating results attained by the various different engineers in charge of the plant at different times. If desired, also the indications may be utilized for automatically controlling various operating conditions of the plant to obtain highest efficiency.

In applying the invention to the problem of indicating the efficiency of a boiler, for example, the invention in general contemplates establishing a plurality of electrical analogues representing respectively the various factors which determine the rate of output, or the net output, in heat units from the boiler. These analogues may be in the form of varying voltages for example, of varying currents, frequencies or phase differences in electrical circuits. Further, according to the invention, such analogues may, by suitable electromagnetic instruments, be added, subtracted or multiplied as necessary to provide a measurement or indication of the rate of energy output or net output, and such measurements or indications may be so correlated with measurements of the amount of fuel used, as to constantly compare the input with the output, or indicate the quotient of the input divided by the output to thereby indicate the efficiency.

Where the boiler is supplied with fuel such as coal, intermittently, the problem of promptly indicating the efficiency involves the difficulty of comparing the continuous steam output with the intermittent fuel input. This difficulty is overcome with one preferred form of the invention, by means and methods utilizing the electrical analogues representing the steam output to transmit impulses at a varying rate corresponding to the varying rate of steam output. And then further means and methods are provided for transmitting another set of impulses so spaced as to provide a measure of the rate of fuel input. The output impulses may be recorded to provide in effect a graphic record of the integrated amounts of the output measurements, and this record, by utilizing the input impulses, may be divided into sections with each section corresponding to a predetermined number of fuel input units. Thus the record may be so calibrated and used as to indicate the output B. t. u.'s in the steam, per measured unit of fuel input, or if the heating value per pound of the fuel has been previously measured, the indications may be given in terms of output B. t. u.'s per B. t. u. input.

In other forms of the invention where fuel is fed continuously or substantially continuously, although if desired at a varying rate, then methods and means may be provided for at once indicating at any moment the rate of energy output divided by the rate of energy input; for example, in terms of B. t. u.'s per hour output, in comparison with the B. t. u.'s in the fuel input per hour.

Various further and more specific objects, features and advantages will more clearly appear from the detailed description given below taken in connection with the accompanying drawings which form a part of this specification and illustrate merely by way of example, preferred forms of the invention. The invention consists in such novel features, arrangements and combinations of parts as may be shown and described in connection with the apparatus herein disclosed and also such novel methods as are disclosed and described hereinafter.

In the drawings:

Fig. 1 is a diagram showing an arrangement according to the invention, as applied to a steam boiler for measuring its efficiency, and where the boiler is being intermittently supplied with fuel such as coal.

Figs. 2, 3 and 4 are views illustrating in further detail, parts of a recording and indicating instrument as used in connection with Fig. 1, and Fig. 5 is a diagram of an arrangement according to the invention as applied for measurement of the efficiency of a boiler which is being continuously fed with fuel.

Referring now to Fig. 1, a boiler is shown at 10 from which a steam line 11 runs to suitable equipment as at 12 for utilizing the steam, for example a heat engine and accompanying condensing and feed water heating equipment. From this equipment a feed water pipe as at 13, containing all, or a part of the condensate, may run back to the boiler. Make-up water if necessary may be introduced as through a pipe 14.

The apparatus hereinafter described in connection with this Fig. 1 is designed to measure, indicate and record the over-all efficiency of the boiler (or possibly a plurality of boilers connected to the same steam line and return means). That is, the arrangement indicates and records the fuel input in units of weight, and at the same time also measures the rate of steam output in terms of B. t. u.'s, also the rate of heat return in the feed water to the boiler or boilers, and then records a comparison between the difference of the latter two measurements, and the fuel input. In other words, the heat of the steam output minus the heat in the boiler feed water is compared with the fuel supplied to the boiler.

To measure the heat contained in the steam output it is theoretically necessary to take into consideration three factors, viz., the rate of supply of the steam in units of weight per unit of time, the pressure of such steam, and its temperature. With the values for these three factors available, reference could of course be had to steam tables to determine the rate of heat output in the steam. Also the heat returned in the feed water may be determined by measuring its rate of flow and multiplying the same by its temperature, thereby obtaining a factor which may be subtracted from the heat of the steam output, to give the net heat output of the boiler. Inasmuch as according to the present invention measurements or indications of the efficiency are to be made available automatically and at once, it will be apparent that means must be provided for correlating the measurements of quantity, temperature and pressure of the steam output without reference to steam tables or any equivalent expedient. It has been found that for practical purposes, within the ranges of the variations in the steam pressure and temperature customarily met with in power plants, that the heat contained per unit of weight of the steam supplied varies substantially in direct proportion to the steam temperature, at least within limits such that the methods and apparatus of the present invention may be operated in practice to give efficiency readings as accurate or even more accurate than with the former methods of manually taking temperature, pressure and flow readings. Thus, in using the examples of the invention hereinafter described, in the usual power plant it has been found that the only variables which need be measured to determine the heat output in the steam from the boiler, comprise first, the rate of output of the steam in units of weight per unit of time, and second the temperature of such steam. Thus, the product of these factors will give a measure of the rate of heat output in the steam without concurrently measuring the steam pressure. The discovery and appreciation of this fact greatly simplify the problem of immediately and automatically measuring the heat content of the steam, by creating electrical analogues varying respectively according to the rate of steam flow and its temperature, and by measuring the product of these analogues, which may be readily done electromagnetically, as by a watt meter type of instrument.

For establishing the electrical analogue varying according to the rate of steam flow, an orifice may be provided as at 15 in the steam main 11, accompanied by a steam flow meter 16 having an indicating hand 17 connected as by linkage 18 to an adjustable contact 19 for a potentiometer 20. Inasmuch as the forces available from the indicator hands of such flow meters are generally quite small, the operating means or mechanism for adjusting the contact of the potentiometer 20 should preferably be such that it may be easily and accurately moved, with negligible friction, by and in accordance with the indicator shaft of the flow meter without interfering with the movement of the latter. Suitable forms of such potentiometers and operating means therefor are disclosed for example in the patent to Constantine P. Xenis, Woodman Perine and Robert E. King, No. 2,273,610, granted February 17, 1942, and entitled "Electrical circuit control devices."

The potentiometer 20 may have one end connected as by a wire 21 to one side of a regulated constant voltage alternating current bus as at 22. The other end of the potentiometer may be connected to the other side of such bus through an automatically adjustable rheostat 23 and a manually adjustable rheostat as at 24. A circuit may be completed from said first end of potentiometer 20 through the primary 25 of a transformer 26, thence through a wire 27 to the adjustable contact 19 of the potentiometer. The voltage applied to said primary 25 will thus be varied in proportion with the adjustments of the potentiometer 20, which in turn will vary in accordance with the steam flow as measured by the meter 16. The meter 16 will, however, normally measure the steam flow in terms of units of volume, whereas it is desired to create an electrical analogue varying in accordance with the rate of flow of the steam as measured by weight. Hence, in order to so modify in effect, the operation of the potentiometer 20 as to produce a voltage directly proportional to steam flow as measured by weight, an indicating thermometer is provided in the steam line as at 28, operatively connected by mechanism as at 29 for adjusting rheostat 23 in accordance with variations of the steam temperature. The mechanism 29 may comprise any suitable known apparatus adapted for this purpose, such for example as equipment now known in the trade under the name "Micromax." Thus rheostat 23 as adjusted in accordance with the indications of the thermometer 28, acts in effect to so modify the action of the flow meter potentiometer 20, that a voltage will be applied to the transformer 26 varying in direct proportion to variations in the rate of steam flow as measured by weight. The manually adjustable rheostat 24, is for the purpose of adjusting the constants of the circuit upon its being initially set up.

The secondary 30 of transformer 26 may be connected in series with current coils as at 31, 32 of an impulse type watt hour meter 33; the circuit being completed as through a rheostat 34, which, after the apparatus is set up, may be manually adjusted in a manner dependent upon the constants of the equipment. Thus, the watt hour meter current coils 31, 32 will carry an "electrical analogue" comprising a current varying in accordance with the variations in the rate of steam flow.

To establish an electrical analogue varying in accordance with the steam temperature, an indicating thermometer may be placed in the steam line as at 35 accompanied by a potentiometer 36 connected at one end to one side of the constant voltage bus 22 as shown, and connected to the other side of such bus as through a manually adjustable rheostat 37. A variable connection as at 38 for the potentiometer 36 may be accompanied by a temperature scale as shown, and if the temperature changes are not frequent this connection may be manually adjusted by amounts corresponding to variations in the indications of the thermometer 35. If the temperature of the steam varies substantially or frequently, it may be desirable to effect these adjustments automatically by suitable known apparatus such for example as the above mentioned "Micromax."

The watt hour meter 33 may be provided with a potential coil 39 having one end connected to the constant voltage bus as shown and the other end connected to the adjustable contact 38. Thus a potential is applied to the coil 39 varying in direct proportion to the steam temperature variations.

Now if the current in the watt hour meter coil 31 is multiplied by the voltage applied to coil 39, it will be apparent that the resulting product will provide a measure of, or "analogue," for the varying rate of heat output in the steam from the boiler. This multiplying operation may be accomplished in the watt hour meter 33, by the cooperating current and potential coils 31, 39 acting in the same manner that the current and potential coils of an ordinary watt meter multiply currents by voltages and apply a torque to the rotor of the instrument to measure power.

Since the equipment of Fig. 1 is intended to indicate or measure the net heat output from the boiler, means is also provided in the watt hour meter to subtract the heat of the feed water from the heat of the steam output. This may be accomplished by providing a potential coil 40 cooperating with the current coil 32. That is, the coil 40 may have applied thereto a voltage varying in accordance with the temperature of the feed water and this voltage is multiplied by the "flow analogue" in coil 32, to provide a measure of the rate of return of heat to the boiler, by way of the feed water. With the equipment as arranged in Fig. 1, it is assumed that the feed water is entering the boiler at the same rate in units of weight, as steam is being discharged through steam line 11 from the boiler. Therefore, the same electrical "flow analogue" may be used to represent the feed water flow, as for the steam flow, namely the current flowing through coils 31 and 32. Hence, the coils 32 and 40 being so arranged in the meter as, in effect, to multiply the rate of flow of the feed water by its temperature, thus provide means giving a measure of the rate of supply of heat to the boiler by way of the feed water. The coil 40 may be so arranged in the watt hour meter as to oppose coil 39 and consequently act to subtract the feed water heat from the heat of the steam as measured by the instrument.

The feed water temperature analogue may be established by equipment similar to that above described for the steam temperature analogue and including, for example, a thermometer 41 in the feed water line, accompanied by a potentiometer 42, having an adjustable contact 43 and an accompanying manually adjustable rheostat 44. It is noted that the terminals of coil 40 respectively may be connected to one side of the constant voltage bus 22 and to the adjustable contact 43, whereby the coil 40 has applied thereto a potential varying in direct proportion to the temperature of the feed water. If desired or necessary, the potentiometer 42 may be adjusted automatically, in the same way as potentiometer 36.

The watt hour meter 33 may be of a suitable known impulse type provided with a contact making device as at 45 for transmitting an impulse each time the watt hour meter has measured a predetermined amount of power. These impulses may be transmitted over wires as at 46, 47 connected in circuit with a suitable source of current, such as a battery 48 and a solenoid 49. Thus, the solenoid will receive impulses from the watt hour meter at a rate varying in accordance with the varying rate of net heat output of the boiler.

The solenoid 49 may have a spring retained armature 50 for operating a pawl 51 and ratchet wheel 52 connected as through a friction drive 53, to an indicator hand or pointer 54, forming a part of an instrument which may be constructed as a modified form of graphic demand meter having, for example, a circular chart as at 55 driven at uniform speed in any suitable known manner. The indicator hand 54 may be arranged as shown with a pen point to provide a graphic record in the form of arcuate lines as at 56, extending generally transverse to the direction of movement of the portion of the chart on which the lines are drawn. That is, with each impulse received by solenoid 49, the indicator hand 54 will extend one of the lines 56 by an increment representing the integrated amount of the measurements of the net heat output for the boiler occurring during the time between two succeeding impulses.

The means will now be described which serve to transmit impulses representing the amount of fuel being supplied to the boiler. The boiler may, for example, be fed with coal, which is weighed in buckets by automatic weighing scales, whereby each bucket, when filled with a predetermined weight of coal, is dumped onto an automatic stoker for the boiler. Such equipment is well known and need not be illustrated or further described. If the boiler is accompanied by two sets of such weighing scales, for example, operating alternately, such scales may be provided respectively with switches as at 60 and 61, whereby one of these switches is actuated each time a bucket full of fuel of predetermined weight is supplied. These switches may be connected in parallel in a circuit provided with a suitable source of current such as a battery 62, and connected to a solenoid 63. Thus, the solenoid 63 will receive an electrical impulse each time a predetermined amount by weight, of fuel is supplied to the boiler.

The solenoid 63 may be accompanied by a spring retained armature 64 for operating a pawl 65 and a ratchet wheel 66. This ratchet wheel may be connected to rotate a contact-making device as at 67 formed of insulating material except for a contact piece as at 68 inserted in its periphery. This contact-making device may also include a pair of spring contact elements as at 69, 70 which, when engaged by the member 68, will serve to complete a circuit from a source of current such as a battery 71 through a solenoid 72. This circuit may also include a spring contact 73 in fixed position, cooperating with a contact member 74 mounted upon the armature 75 of solenoid 72.

The solenoids 63 and 72 are arranged to operate as follows. Each measured quantity of fuel supply will serve to operate one or the other of the switches 60, 61, whereby the resulting impulses will actuate solenoid 63 and advance ratchet wheel 66 in the direction indicated by the arrow through an angle corresponding to one ratchet tooth, for each measure of fuel supplied. For example, if the boiler is fed with automatically weighed buckets of coal, when 20 of such buckets have been supplied, the ratchet wheel 66, having 20 teeth will have turned through one complete revolution, to thereby bring contacts 68 and 69 together for closing the circuit through solenoid 72, once per each 20 buckets of coal. Thereupon the actuation of solenoid 72 will cause the indicator hand 54 to be pulled down to the center or zero line on chart 55. The friction drive 53 will permit the hand to be quickly pulled down in this way without interfering with the action of the pawl and ratchet 51, 52. Just before the armature of solenoid 72 reaches its lowermost position, the circuit may be broken by the contacts 73 and 74, which will keep this circuit disconnected until contact piece 68 has left the contacts 69. Thus the contacts 73, 74 will prevent the solenoid 72 from again pulling down the indicator hand 54 until ratchet wheel 66 rotates through another complete revolution.

Thus with the particular arrangement above described and shown in Fig. 1, the solenoids 63 and 72 as controlled by the measurements of the fuel input, will serve to interrupt the graphic record of the steam output, and cause the indicator hand 54 to be moved into position for starting a new section of the record, each time 20 weighed buckets of coal or other fuel are supplied to the boiler. Thus, in effect, the graphic record of the integrated amounts of the heat output measurements is divided into sections, each section representing the net amount of heat output per predetermined number of units of fuel input. Thus, for example, one of the lines 56 may represent by its length, the net output in terms of B. t. u.'s per 20 weighed buckets of fuel input. More specifically the 20 impulses, for example, may represent the equivalent of the combustion of 8000 pounds of coal. The chart or dial 55 may then be printed for example, with lines as at 76 calibrated to read the lengths of the lines 56 in terms of B. t. u.'s net output per 8000 pounds of coal supplied.

In Figs. 2, 3 and 4 attachments are shown which may be applied to the chart 55 for translating the readings on this chart directly into terms of B. t. u. output per B. t. u. of fuel value in the input, or if desired, in terms of efficiencies in percentages. A scale member 80 may be provided as shown to cover a sector area of the chart 55, and this member may be formed with lines as at 81 which are tangential extensions of the lines 76 on the chart. Another scale member of sector shape as at 82 may be pivotally mounted as at 83 to the inner end of the member 80 and arranged to slide under the member 80, and to be adjusted in various positions circumferentially as by a thumb piece 84 threaded on a stud extending through an arcuate slot 85 in the member 80. The scale member 82 may be formed with radial lines as at 86 graduated in terms of B. t. u.'s per pound of fuel. When using this scale, the fuel is previously analyzed to determine its B. t. u. content per unit of weight, and then the scale member 82 is so adjusted beneath the member 80, that one of the lines 86 will coincide with the edge 87 of the member 80. That is, for example, if the fuel is found to contain 15,000 B. t. u.'s per pound, then the scale member 82 will be adjusted to the position shown in Fig. 2. Again, if the B. t. u. content is found to be, for example, 14,500, then the scale member 82 would be moved out until the edge 87 coincided with a radius on member 82 drawn half way between the lines marked 14,000 and 15,000 respectively. The scale member 82 may also be formed with graduation lines as at 88, calibrated in terms of efficiency in percentages, and extending transversely and at varying angles in respect to the lines 86. In reading this scale, let us assume for example that one of the lines 56 representing the steam output, extends up to the line marked $a$ on chart 55. Then the tangential continuation b of this line is followed to the edge 87 of member 80. At this point one may read from the graduation lines 88 on member 82, the efficiency in percentages along scale 89.

In order to permit the scale member 80 with the member 82 attached, to be lifted from the dial or chart 55 to permit the chart to be replaced, the member 80 may be mounted on a hinge as at 90, to the pintle of which a fork-like member as at 91 may be attached for receiving a pencil or rod to tilt the scale members into the vertical position shown in Fig. 5. Also a cam member as at 92 may be secured to the pintle of the hinge for engaging a spring member 93 for retaining the scale members in place either horizontally or vertically, as will be apparent in Fig. 4. The hinge may be carried by a bracket as at 94 mounted upon the base of the instrument and secured as by screws 95, which in turn may be adjustable along an arcuate slot as at 96 so that the scale members 80 and 82 may be moved to a suitable position circumferentially for convenient reading without interfering with the indicator hand 54.

In Fig. 5 another embodiment of the invention is shown, portions of which are the same as, or similar to corresponding parts of Fig. 1, whereas other parts are so modified as to permit the invention to be used with another type of fuel feeding device and under different operating conditions for the boiler. As in Fig. 1, boiler 10, steam line 11 and heat engine 12 with associated equipment are here shown, together with a feed water pipe 13.

As above stated, with the equipment of Fig. 1 it was assumed that the feed water would be supplied to the boiler at the same rate by weight as steam is being furnished from the boiler, and hence in Fig. 1 a single flow meter measuring the flow of steam from the boiler could be used and the "electrical analogue" produced thereby could also be used as a measure of the rate of flow of feed water into the boiler. However, with the arrangement of Fig. 5 means are provided for measuring both the flow of steam from the boiler, and the flow of feed water into the boiler, and thus the equipment is such as to indicate the net heat output at any moment even though, while the indications are being given, the quantity of vaporizable medium in the boiler may be increasing or decreasing, that is, while the feed water is being introduced at a rate greater (or less than) the rate of supply of steam from the boiler. For measuring the rate of steam flow from the boiler and for establishing temperature and flow analogues therefor, the circuits and devices in Fig. 5 may be the same as in Fig. 1, and same are identified by like reference numbers. However, instead of the impulse type of watt meter as indicated at 33 in Fig. 1, there is shown in Fig. 5 at 33', a polyphase watt meter type of instrument having a current coil 31' for carrying the steam flow analogue which is to be multiplied by the steam temperature analogue carried by the potential coil 39'. The watt meter instrument 33' may also be provided with another current coil 32' for carrying an analogue representative of the feed water flow, and another potential coil 40' for receiving an analogue representative of the feed water temperature. The coil 40' may be positioned in the watt meter so as to oppose coil 39' and thereby the product of the analogues in coils 32' and 40' for the feed water, will be subtracted from the product of the analogues for the steam in coils 31' and 39', to thereby provide a total torque on the watt meter indicator hand B representative of the net heat output of the boiler. The indicator hand B may be accompanied by a scale b calibrated in terms of net output in B. t. u's per hour.

For establishing the feed water flow analogue, an orifice as at 100 may be positioned in the feed water pipe 13 and accompanied by a liquid flow meter 101 having an indicator hand as at 102 connected by linkage as at 103 to an adjustable contact 104 of a potentiometer 105. While the meter 101 theoretically will measure the volume of the feed water flow, since in this case the flow is of a liquid, such volumetric measurements will be in direct proportion to the rate of flow in units of weight, and therefore potentiometer 105 will be adjusted by and in accordance with the rate of flow of the feed water by weight. As in the case of the potentiometer 20 of Fig. 1, the potentiometer 105 may be connected to constant voltage bus 22 through a circuit including a rheostat 106 manually adjustable after the apparatus is set up, in a manner dependent upon the constants of the circuits, etc.

The adjustable contact 104 may be connected to one side of a primary 107 of a transformer 108, the other side of said primary being connected to one side of the regulated bus and to one end of the potentiometer 105. The secondary 109 of transformer 108 may be connected through a rheostat 34' to current coil 32' of the watt meter instrument.

For establishing the feed water temperature analogue as applied to watt meter potential coil 40', the same circuits and devices may be used as explained in connection with Fig. 1 for the same purpose, and in Fig. 5 the corresponding parts are identified by like reference numbers.

As contrasted with the intermittent supply of fuel with the equipment as of Fig. 1, the arrangement of Fig. 5 includes means for indicating the efficiency wnere the boiler is fed with fuel by a continuously operating fuel feeding device as at 110. That is, the device 110 is adapted to continuously supply fuel, for example crushed or pulverized coal, or oil, and at a rate which may be variable but at a rate which is proportional or substantially proportional to the speed of rotation of a drive shaft 111 for the device 110. Thus a speedometer drive as at 112 may be applied to this shaft and connected to a speedometer as at 113 having an indicator hand A. This indicator hand may be accompanied by a scale a calibrated in terms of fuel input in units per unit of time, for example, gallons of fuel per hour. Thus, the pointers A and B will serve to give correlated indications enabling immediate comparison at any moment of the net output in B. t. u.'s as against the particular rate of fuel input then prevailing.

By positioning the instruments 33' and 113 so that their pointers will assume various crossed or intersecting positions as shown, throughout the useful ranges of their respective scales, a dial c may be provided beneath the crossed pointers, and so arranged and calibated as to read directly in terms of efficiency, i. e., so as to give the quotient at any time of the input indication divided by the heat output indication. The manner in which such a scale or dial c may be formed is explained in further detail in the above mentioned copending application entitled "Methods and apparatus for indicating efficiency of turbo generators and other power plant equipment." In brief, this dial c may comprise what may be termed "isoquotient" lines. These lines are so drawn that, for example, if the crossing point of the pointers is above any point along one of these lines, then the readings on the scales $b$ and $a$ respectively will be such that their quotient is the same as the number by which that line is identified. It will be apparent that the isoquotient lines may be drawn by connecting together several points corresponding to the crossing points of the pointers when set at different times to give several indications, the quotients of which are all of a predetermined value corresponding to the notation on the line being drawn.

If the fuel has been analyzed to determine its heat value, the scale $a$ may be calibrated in terms of input in B. t. u.'s per hour and the isoquotient lines on dial $c$ may then be calibrated directly in terms of efficiency and percentages. Different charts with scales $a$ and $c$ properly calibrated for various different fuel heating values may be provided so that when a particular fuel is being used, the proper corresponding chart may be applied, to enable the operator of the power plant to directly read the efficiency indications.

The principles according to which the various circuit constants of the above described steam output measuring apparatus may be selected, together with the preferred mode in which these principles may be applied and the equipment adjusted and calibrated, will now be explained. In establishing the above described "analogues" for the steam measurements, the first requirement is to secure a constant voltage source from a suitable regulator. For the particular examples above described, a constant voltage of 115 volts at 60 cycles was selected and applied from a suitable known type of regulator to the busses 22. The voltage magnitude chosen fixes in general the maximum voltage available in the various circuits energized thereby, and such maximum voltage is then subdivided and apportioned by the several resistors and potentiometers. Referring now to Fig. 1, the flow meter or current circuit may be treated as a starting point in the design, with constants depending upon the particular watt hour meter current coils 31, 32 to be used. If for example 5 amperes be taken as a reasonable maximum current for these coils, then the circuit therefor may be designed so that for maximum steam flow, 5 amperes will be circulated. Neglecting steam pressure with the present examples of the invention (for the reasons above explained), this condition may be obtained when the flow meter is at maximum deflection and the steam temperature at the same time is at its operating minimum (maximum steam density). For this condition all the supply voltage would appear across the flow meter potentiometer and its output voltage would be at a maximum and equal to that of the supply voltage. The ratio between the flow meter potentiometer resistance (as at 20) and its temperature-correcting resistance (23) where one is used as in Fig. 1, is next fixed so that the current from the combined circuit of the two resistances can be increased and decreased precisely as the flow meter density factor increases and decreases with steam temperature changes. When this ratio has been fixed, it then remains to assign the absolute values of resistance, but these in practice depend upon other factors as follows: The watt hour meter instrument current circuits are inherently of low impedance requiring only a small voltage for the circulation of 5 amperes, and moreover, potentiometer windings and contacts designed to carry 5 amperes, are generally impractical in equipment of this class. Hence a transformer as at 26 is preferably used which will circulate 5 amperes in the secondary or instrument circuit when voltages of the order of 115 volts are impressed on its primary from the potentiometer. A resulting small current then flows in the primary. In order to preserve the linearity of response of the potentiometer, the load current must be small compared with the normal or non-load current through the potentiometer itself. We have found that a ratio of 1 to 10 is satisfactory and therefore the absolute values of the resistances (such as at 20, 23 and 24 in Fig. 1) may be so assigned that for the given supply voltage, the ratio of load current to potentiometer current will be of this order. In designing the steam temperature potentiometer and associated potential circuits, the supply voltage magnitude is taken as one point of reference. That is, since the B. t. u.'s per pound of the steam (for substantially constant pressure) vary substantially with the temperature, and since voltage has been chosen to represent temperature and thus B. t. u.'s per pound of steam, this potentiometer is arranged to transmit maximum voltage when the steam temperature is at its operating maximum (maximum B. t. u.'s per pound, heat content) and lesser voltages for lower temperatures in proportion. The ratios of the various parts of the potentiometer and absolute values of resistance are fixed by the operating steam temperature range and by the magnitude of the current drawn by the watt hour meter potential circuit of coil 39.

With the steam flow and steam temperature circuits designed, the effect has been to establish in the analogue system a relation of B. t. u.'s per pound per volt. To design the feed water potentiometer circuit, it is now only necessary to know the operating range of water temperatures and thus the operating range of B. t. u.'s per pound of water, and we then have the voltage range for the circuit of this potentiometer. With the particular example of Fig. 1, these voltages were found to be of the order of one-fourth of those for the steam temperature circuits. Hence rather than operate the potential coil of the watt hour meter at low voltages, the associated current coil or coils of the watt hour meter (as at 32) may be adjusted to have one-fourth the number of turns of the current coil or coils 31 associated with the steam temperature element of the watt hour meter. This permits full voltage excitation of the potential coils with consequent preservation of meter accuracy, and yet producing the desired one-fourth torque.

After selecting or designing the potentiometers in accordance with the above principles, the circuits may be conveniently be set up in a laboratory in conjunction with the particular transformer 26 and the particular type of watt hour meter 33 chosen. Due to various unpredictable factors as to the details of construction and operation of the potentiometers or the connections therefor, they may not deliver voltages which will accurately agree at various settings with those calculated. Accordingly it is advisable to accompany each of the potentiometers with the manually adjustable rheostats (as at 24, 37 and 44, Fig. 1), whereby the current to these potentiometers after being set up in the manner intended for use, may be so adjusted that the potentiometers will deliver the desired voltages.

Similarly because of unpredictable factors in the transformer 26 and its connections, or the watt hour meter current coils 31, 32, the current in the latter may not accurately correspond to that intended or calculated, and accordingly the circuit of these coils may be provided with a manually adjustable resistance as at 34, to compensate for the error to which the current would otherwise be subject.

With the circuits set up as above explained, the rate of transmission of impulses by the watt hour meter may be adjusted either in the laboratory or after installation in the power plant, by arbitrarily applying in succession several different sets of adjustments to the potentiometers, representing various particular flow and temperature values. For each set of such values the "net steam output in B. t. u.'s" may be calculated and the watt hour meter then adjusted to transmit a number of impulses in a given time predetermined as properly representative of the integrated amount of the B. t. u. output during such time. With the B. t. u.'s per watt hour meter impulse thus fixed, and knowing the height to which the indicator hand or pointer 54 is elevated with each impulse, then the lines 76 on chart 55 may be readily calibrated in terms of B. t. u.'s net output.

The potentiometers and their circuits of Fig. 5 may be selected and designed according to the same principles above explained as to these parts in connection with Fig. 1. With the circuits of Fig. 5 set up, the scale $b$ may be readily calibrated by arbitrarily applying in succession several different sets of adjustments to the potentiometers, representing various particular flow and temperature values. For each set of such values the "net output in B. t. u.'s" may be calculated and a corresponding notation placed at the point on scale $b$ where the pointer B comes to rest with the potentiometers adjusted at the values used for the calculation. Since the divisions along scale $b$ will be substantially equal, the whole scale generally may be calibrated and safely checked upon making three or four sets of adjustments of the potentiometers, and comparing the calculated reading with the actual reading in each case.

The use of a regulated constant voltage source of alternating current form has the advantage, as disclosed in another application, that where the system is used with a steam supply of varying pressure, then such varying pressure may be used to vary the power factor as between the voltage and current coils in the meters 33, 33', and thereby correct the net output B. t. u. impulses or readings according to the varying steam pressure. In connection with the particular examples above described, it should be noted that the final phase position of the current and voltage vectors at the meters should be held fixed and preferably in phase, as will occur if the reactance and capacity factors of the voltage and current circuits respectively do not differ greatly. Any difficulties encountered in this respect may ordinarily be overcome by trial adjustments of the various manually adjustable resistances.

While the invention has been described in detail with respect to particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. Apparatus for indicating efficiency of a boiler which is supplied during each of a series of variable intervals with a predetermined amount of fuel, comprising means for continuously measuring the heat of the steam output of the boiler, a recording device for making a graphic record of the integrated amounts of such measurements, means for automatically counting a predetermined number of said intervals and then acting in cooperation with said recording device to indicate that section of the record which was made during said predetermined number of intervals, whereby the heat output during the supply of a predetermined amount of fuel is indicated.

2. In combination with vapor-generating equipment, apparatus for indicating its efficiency comprising recording mechanism constructed and arranged for continually providing a graphic record of the succeeding small predetermined integrated amounts of the heat of the vapor output of the equipment, mechanism for automatically measuring the amount of the energy-containing medium as supplied to the equipment, and means controlled by the latter mechanism and constructed and arranged for dividing said record during its formation into portions corresponding respectively to periods during each of which predetermined amounts of said measured energy-containing medium were supplied to the equipment.

3. In combination with energy-transforming equipment, apparatus for indicating its efficiency comprising, a moving chart, instruments for measuring the output energy, mechanism controlled by said insruments for successively forming indications on said chart, each representing a predetermined amount of said measured output energy, means for measuring the amount of the energy-containing medium supplied to the equipment, and means constructed and arranged to operate under the control of the latter measuring means for indicating on said chart, the number of said indications which occurred during the supply of each successive predetermined amount of said measured medium.

4. In combination with energy-transforming equipment, apparatus for indicating its efficiency comprising, a moving chart, instruments for measuring the output energy, mechanism controlled by said instruments for successively drawing lines on said chart in directions generally transverse to the direction of movement of the chart and at a rate substantially proportional to such output as concurrently measured, means for measuring the energy-containing medium supplied to the equipment, and mechanism controlled by the latter means for interrupting each of said lines and causing the next line to be started, at each time when a predetermined amount of said measured medium has been supplied.

5. In apparatus for continually measuring the varying heat in the steam output of a boiler installation, the combination of a flow meter for measuring the varying rate of the steam output by volume, an electric circuit with control means operatively connected with said flow meter to automatically vary an electrical characteristic of said circuit in accordance with said varying rate of steam output, means constructed and arranged for modifying the effective adjustment of said control means in accordance with temperature variations in the steam output whereby said characteristic is varied in direct proportion to the rate of steam output by weight, another electric circuit with control means for varying an electrical characteristic thereof in accordance with the varying temperature of the steam output, an electromagnetic instrument constructed and arranged in cooperation with said circuits for maintaining a force varied by said two characteristics, according to the product thereof, whereby said force continually provides a measure of the varying product of the steam output temperature and its concurrent rate of flow by weight, and thus a measure of said varying heat.

CONSTANTINE P. XENIS.
LESTER J. PARSONS.
WOODMAN PERINE.
ROBERT E. KING.
HAROLD A. BAUMAN.